(12) United States Patent
Stark

(10) Patent No.: US 7,654,285 B2
(45) Date of Patent: Feb. 2, 2010

(54) HIGH-PRESSURE COUPLING DEVICE FOR DIRECTING MEDIA THROUGH QUICK-CHANGE SYSTEMS

(75) Inventor: Emil Stark, Götzis (AT)

(73) Assignee: Andreas Maier GmbH & Co. KG, Fellbach (DE)

( * ) Notice: Subject to any disclaimer, the term of this patent is extended or adjusted under 35 U.S.C. 154(b) by 389 days.

(21) Appl. No.: 10/553,645

(22) PCT Filed: Apr. 15, 2004

(86) PCT No.: PCT/EP2004/003943

§ 371 (c)(1),
(2), (4) Date: Jul. 24, 2006

(87) PCT Pub. No.: WO2004/091848

PCT Pub. Date: Oct. 28, 2004

(65) Prior Publication Data
US 2007/0035076 A1 Feb. 15, 2007

(30) Foreign Application Priority Data
Apr. 15, 2003 (DE) ................................. 103 17 340

(51) Int. Cl.
F16L 29/00 (2006.01)
B23Q 3/00 (2006.01)
(52) U.S. Cl. .................. 137/614.03; 269/309
(58) Field of Classification Search .......... 137/614.03, 137/614.04, 614.05; 269/309, 310
See application file for complete search history.

(56) References Cited

U.S. PATENT DOCUMENTS

| 4,763,401 | A | | 8/1988 | Marinoni et al. ............... 29/568 |
| 4,971,107 | A | * | 11/1990 | Yonezawa .............. 137/614.05 |
| 6,644,331 | B2 | * | 11/2003 | Arisato .................. 137/614.03 |
| 6,860,290 | B2 | * | 3/2005 | Knuthson .............. 137/614.03 |

FOREIGN PATENT DOCUMENTS

| DE | 32 32 367 A1 | 3/1984 |
| EP | 1 050 363 B1 | 4/2000 |

* cited by examiner

Primary Examiner—Kevin L Lee
(74) Attorney, Agent, or Firm—Baker & Daniels LLP

(57) ABSTRACT

Disclosed is a high-pressure coupling device for directing media such as oil, water, gases, fats, and similar through quick-change systems. Said high-pressure coupling device comprises a bottom part and a top part. The bottom coupling part is provided with a firmly anchored, stiff valve thorn in the form of a valve screw which creates the sealing effect for delivering the medium along with a spring-loaded slide valve sleeve while the top coupling part is provided with a spring-loaded valve plate that creates the sealing effect for the side of the coupling device, which is to be supplied with high-pressure medium, together with a stiff valve body such that a stiff valve element actuates the spring-loaded valve element of the opposite part in the high-pressure coupling device in a valve-actuating manner when the bottom coupling part and the top coupling part are joined.

33 Claims, 8 Drawing Sheets

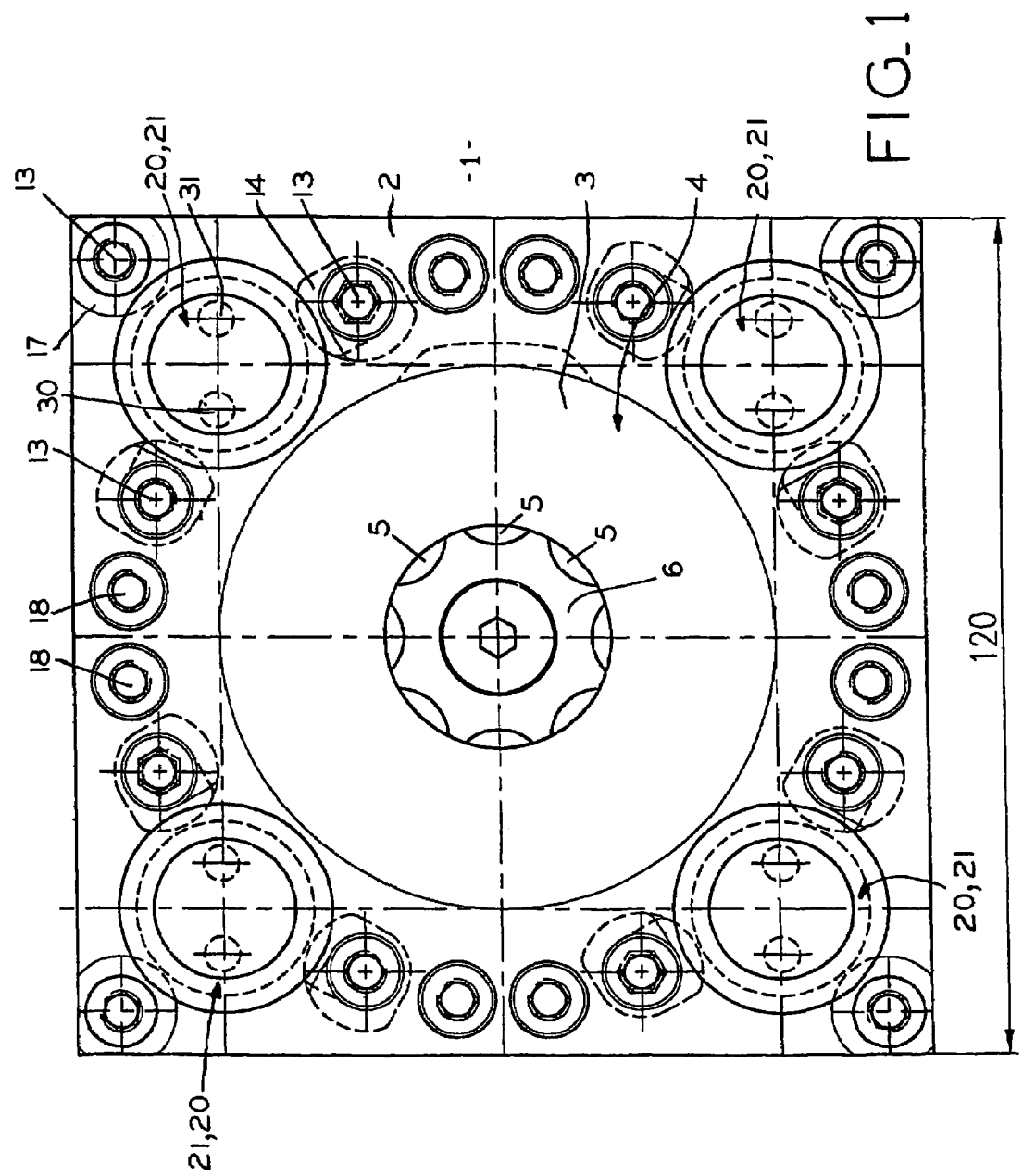
FIG_1

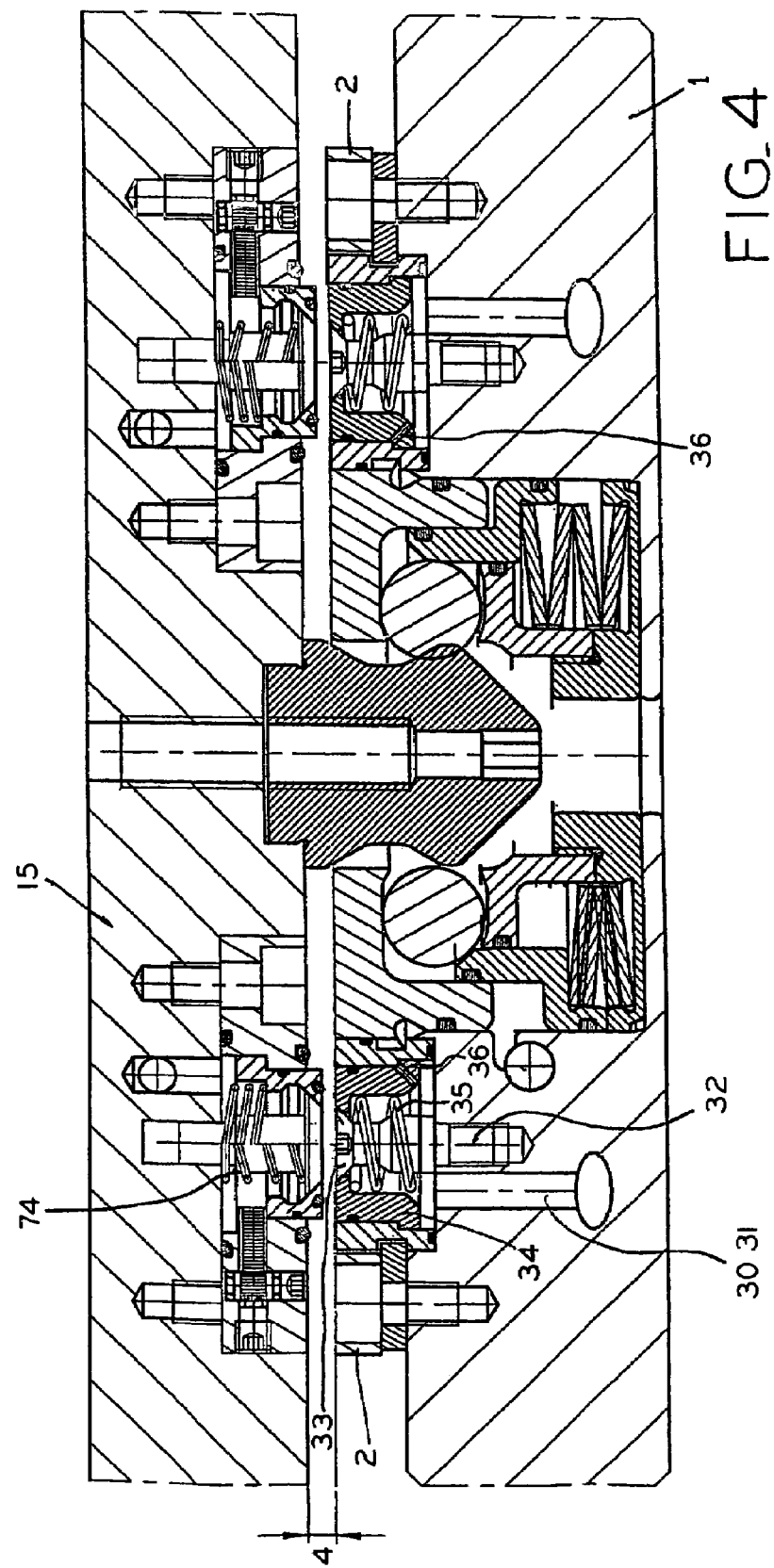

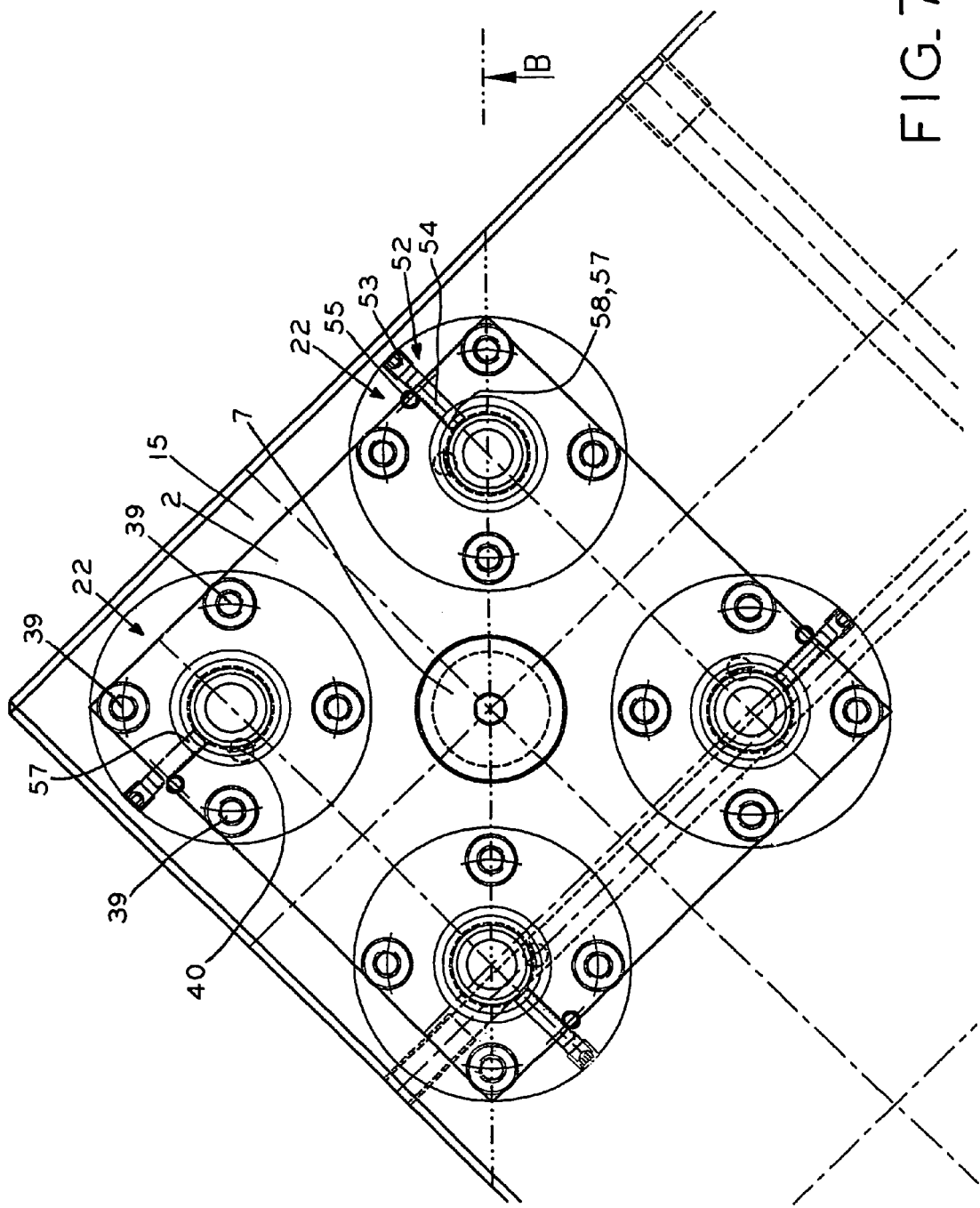

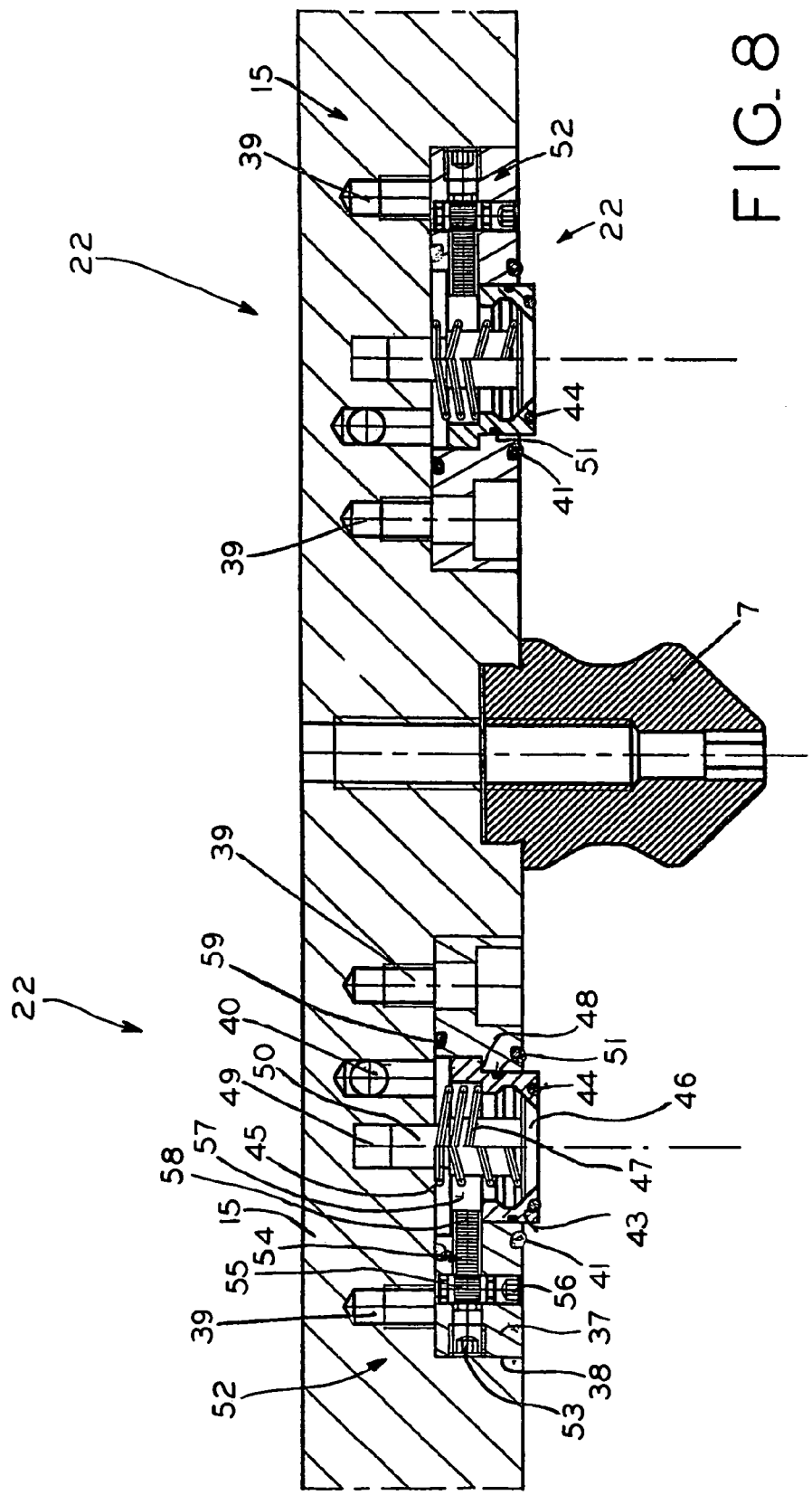

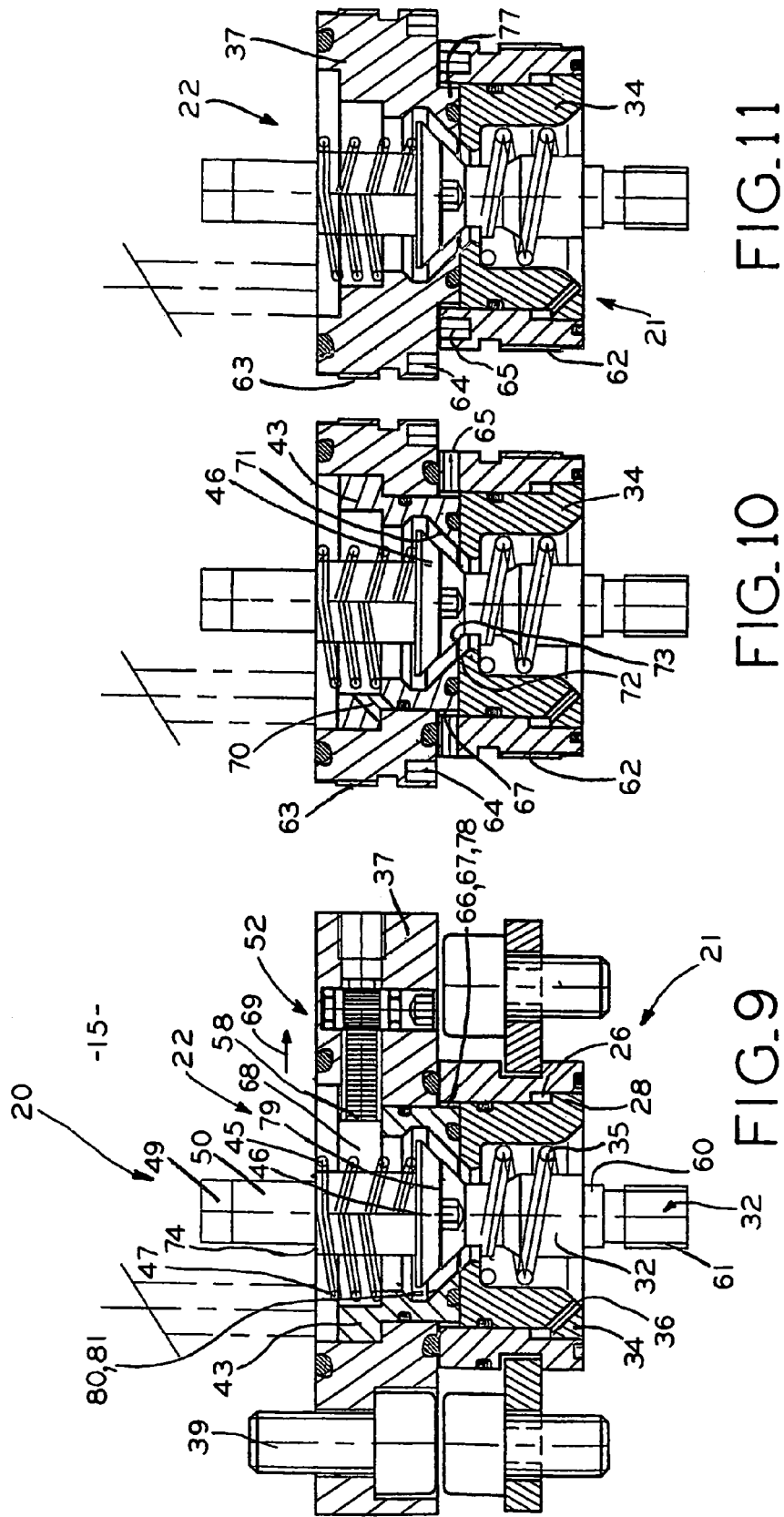

HIGH-PRESSURE COUPLING DEVICE FOR DIRECTING MEDIA THROUGH QUICK-CHANGE SYSTEMS

BACKGROUND OF THE INVENTION

The invention relates to a high-pressure coupling device for directing media through quick-change systems.

Such a high-pressure coupling device became known for example with EP 1 050 363 A2, which goes back to the same inventor. The invention's field of application refers to all high-pressure coupling devices for directing a high-pressure medium, for example such as oil, water, gas, fats and similar media. The inventive high-pressure coupling device is therefore applicable for all quick-change systems, in particular for quick-change systems in processing machines, however also for quick-change systems for example such as the coupling of a dredging shovel to a post and similar devices.

Thus the invention is not limited to the description of a high-pressure coupling device in connection with a quick-change system with the help of a work-piece pallet and one or more rapid-action clamping cylinders arranged in the machine table.

In the initially mentioned EP 1 050 363 A2 the high-pressure coupling device was arranged directly in the cover of a rapid-action clamping cylinder embedded in the machine table. However, with this there was the disadvantage that only a severely limited installation space was given for the high-pressure coupling device, because it was integrated in the small-size cover of a conventional rapid-action clamping cylinder. Only slight openings could be achieved and the rate of flow per time unit was thus severely restricted.

Additionally the pressure range was limited to only about 150 bar maximum, because with higher pressures and higher rates of flow a forced closing of the valve resulted because the existing spring restricted the maximum pressure.

It was a matter of a single-sided acting valve which permitted a high rate of flow in the one direction, but permitted only a low rate of flow in the other direction. If the rate of flow in the reverse direction was exceeded, the valve closed.

In other respects, in the case of higher pressures it turned out that the valve case bulged out over the surface of the cover of the quick-clamping cylinder in undesirable manner, which resulted in leakage and high pressure-oil loss.

The top side of the valve body thus bulged out over the surface of the cover of the rapid-action clamping cylinder, as a result of which a flat rest of the workpiece pallet that is to be placed with high precision on the rapid-action clamping cylinder was no longer given. As a result of this the entire system warped.

Due to the repeated distortion of the oil flow in the case of the known system there were friction losses and an unintentional heating up of the valve in the case of media flowing through at a high rate of speed.

Due to the unintentional heating up of the valve at high rates of flow the entire rapid-action clamping system warped, which led to an inaccuracy in the processing of the workpieces clamped on to the workpiece pallet.

With the use of quick-switching solenoid valves in medium flow there was the further disadvantage that as a result of the switching impacts that were transferred to the medium the valve body in the known valve clogged up and blocked in terms of a self-closing.

In the case of such an oil impact it could also happen that the valve body in the top part was brought into an on position in undesirable manner, as a result of which the seal between the top and bottom parts was terminated and a lateral pressure oil loss took place.

SUMMARY OF THE INVENTION

The invention is therefore based on the object of improving a pressure coupling device for directing media through quick-change systems in such a way that said pressure coupling device is suitable for a high pressure of up to 500 bar without initiating undesirable deformation forces on the rapid-action clamping cylinder, and which guarantees a safe function.

The invention is characterized by the technical teaching of Claim 1 for the solution of the posed problem.

One subject of the invention in the process is the fact that the table-side of the coupling device exhibits a valve embedded in the machine table in the form of a valve screw, which works together with the coupling device top part arranged in the opposed workpiece pallet in terms of a valve actuation, and that the machine table side of the coupling device is firmly embedded in the machine table.

In order to simplify the further description, in the following description it is assumed that the part of the high-pressure coupling device arranged in the machine table is termed the coupling device bottom part, while the part of the high-pressure coupling device that is arranged in the opposed workpiece pallet is termed the coupling device top part. These terms are arbitrary and interchangeable.

By means of the arrangement of a rigid mandrel which is anchored in the machine table and to which the coupling device bottom part belongs, the advantage is achieved that the surface impacted by oil pressure on the mandrel is no longer in undesirable manner transferred in terms of a deformation to the rapid-action clamping cylinder, because in accordance with the invention the high-pressure coupling device is arranged outside the region of the cover of the rapid-action clamping cylinder.

This is a significant advance compared to the state of the art, because in the case of the state of the art the high-pressure coupling device was arranged in the region of the cover of the rapid-action clamping cylinder and with it there was the disadvantage that first the installation space for the high-pressure coupling device—due to the restricted cover area—was severely limited, as a result of which for example only one oil hole with a passage of 4 mm was attainable.

A further disadvantage lay in the fact that due to the attachment of the one coupling device part on the cover of the rapid-action clamping cylinder high deformation forces in the case of correspondingly high oil pressures of the coupling system were transferred to the rapid-action clamping cylinder in terms of a deformation force.

The high pressure medium working on the coupling device bottom part in terms of a lifting movement acted accordingly on the threaded joints of the cover of the rapid-action clamping cylinder also in terms of a lifting movement, as a result of which these screws were placed under a great deal of shearing stress. This resulted in the high-pressure coupling device only being able to be impacted with a pressure of a maximum of 150 bar, because pressures exceeding this maximum—in particular also oil impacts—resulted in the shearing of their high-pressure coupling device or connection screws between the cover of the rapid-action clamping cylinder and the machine table.

If in the case of the state of the art the workpiece palette were lifted, that is the coupling device bottom part was separated from the coupling device top part, then the high pressure of the medium acted on the entire piston area and additionally also acted on the closed coupling device bottom part of the high-pressure coupling device.

In the case of the state of the art in other respects there was the disadvantage that two freely sliding valve bodies acting upon each other with opposing elastic force were present, whereby the one valve body was present in the coupling device bottom part and the other valve body was present in the coupling device top part. In the case of corresponding high-pressure impact—in particular high-pressure alternating loads—for this reason the valve bodies could be unintentionally oscillated and the form could begin vibrating, so that they would strike each other in the area of the contact surfaces and destroy each other.

It is important that both valve bodies open simultaneously. Thus an automatic sequence control as in the state of the art is not used, in which first the one valve body and then the other valve body is activated. Instead, a completely dripless connection is created, which during the release and coupling based on the flat contact of the gate valve sockets of the top and bottom part and valve mandrel coming into sealing contact with each other are synchronously activated With the technical teaching in accordance with the present invention the advantage is achieved that by means of the fixed arrangement of a valve mandrel in the machine table a spring-loaded closing body can now dispensed with, as was present in the state of the art. In this way the oil pressure acting on the valve body is now absorbed by this fixed mandrel and immediately conducted into the machine table. It is important in this connection that the mandrel works together with a valve body in the manner that the high pressure acting on the coupling device bottom part works like a closing movement on the movable valve body, so that in the case of the appropriate high pressure the valve body automatically closes spring-loaded, which was not the case with the state of the art.

The more pressure initiated in the coupling device bottom part on the stationary mandrel and on the spring-loaded sliding valve body, the greater the closing force of the valve body on the stationary mandrel.

Thus it is a matter of a sealing gasket in the coupling device bottom part that seals even better under high pressure.

The countersunk arrangement of the coupling bottom part in the machine table—outside of the region of the cover of the clamping cylinder—has the further advantage that the entire valve bottom part is protected from tilting and from unwanted mushrooming under the influence of high pressure because it is positively locked in the recess in the machine table and therefore an influence from the high-pressure medium does not result in a deformation of the coupling bottom part.

A further advantage of the invention is that the countersunk arrangement in an associated recess in the machine table achieves a high centering precision towards the coupling top part arranged in the opposing workpiece pallet and in other respects relatively small models are possible because one can use relatively weakly dimensioned wall thicknesses for the two opposing coupling parts because they are supported in associated recesses which counteract deformation.

Therefore relatively small components can be used in a small space because these components are positively locked in the associated recesses in the machine table on the one hand and in the workpiece pallet on the other hand.

Because in accordance with the invention one can now arrange the entire high-pressure coupling device outside of the cover of the rapid-action clamping cylinder, the further advantage exists that one can now can develop the sectional areas of flow significantly more amply dimensioned, because one is no longer dependent on the limited space of the cover of the rapid-action clamping cylinder. One can also used large screw-on bore holes with correspondingly amply dimensioned fastening screws for the fastening of the high-pressure coupling device on the machine table and is no longer dependent on small-dimension screws, which previously had to be screwed into the region of the cover of the rapid-action clamping cylinder.

In other respects, in the fastening of a high-pressure coupling device in the cover region of a rapid-action clamping cylinder only two screws arranged distributed on the periphery can be used, which attach the high-pressure coupling device on the left and right.

In the case of the invention, on the other hand, it is possible to attach the high-pressure coupling device with at least three screws, which are staggered from each other at an angle of about 120°, resulting in a significantly better attachment of the high-pressure coupling device on the machine table.

Of course more than three screws can also be used in the invention for the attachment of the high-pressure coupling device.

Because in accordance with the invention the high-pressure coupling device is now arranged outside of the cover region of the rapid-action clamping cylinder, it is even possible to use significantly more fastening screws for the cover of the rapid-action clamping cylinder, so that it can even be impacted with a high pressure of up to a maximum of 500 bar without having to worry about an unwanted deformation or even the breaking away of the cover of the rapid-action clamping cylinder.

In the case of the invention it is by the way advantageous that the valve body which is spring-loaded in closing direction in the coupling device bottom part only requires a relatively weak spring, because said spring is only necessary for the purpose of overcoming the friction of the valve body in the associated recess in the valve case in order to bring it to the off position.

In the case of the state of the art on the other hand an amply dimensioned spring had to be used, which was across from an also relatively amply dimensioned spring in the coupling device top part, and both springs had to be precisely adapted to the oil flow. For this reason in the case of the state of the art it was a matter of a so-called counterflow coupling device, in which in one direction a high flow rate and in the other direction a low flow rate had to be accepted. In the case of the invention, however, it is a matter of an alternating flow high-pressure coupling device in which the oil flow is identical in both directions of flow.

Thus the invention dispenses with a high-pressure coupling device which works in the manner of a check valve, as is known from the state of the art.

A further advantage of the invention lies in the fact that there is a positive control of the valve movements between the coupling device top part and coupling device bottom part, because in specified embodiments the spring-loaded valve body arranged in the top can be completely dropped. When this spring-loaded valve body is dropped, only a rigid, unsprung projection is present, which activates the corresponding, weak-spring-loaded valve body in the coupling device bottom part.

Thus it is a matter of a positive control which sees to it that there are no unintentional oscillations of the two counteracting springs, but rather that the oil flow flowing through the valve keeps the movable parts in check, without moving them against a spring load.

Another embodiment of the invention provides that the high-pressure coupling device can be used optionally as a positively controlled design and optionally as a non-positively controlled design. In this special embodiment the previously mentioned spring-loaded valve body in the coupling device top part can be optionally blocked or released, as a result of which the coupling device can be operated either positively controlled or non-positively controlled.

In the process in the case of the non-positively controlled coupling device the valve body in the top is subjected to spring-loaded compression against an associated sealing surface on the valve body of the bottom part.

In spite of this an undesirable leakage in the space between the coupling device top part and bottom part placed on top of each other for sealing purposes is not to be feared because the coupling device top part is still seated on the valve case of the coupling device bottom part with additional sealing surface and a sealing ring.

A further advantage of the invention is the fact that a rigid stop edge on the spring-loaded valve body in the coupling device top part restricts the valve movement in the direction of the opening and in the case of alternating load of the oil flow prevents an uncontrolled hammering of this valve body. In this way at the same time the valve bodies of the top and bottom part which are lying on top of one another in a sealing manner are prevented from hammering each other in the contact region and destroying one another. In this way, in accordance with the invention a floating contact of the two spring-loaded valve bodies is dispensed with, said floating contact which was connected with a high risk of damage in the case of oil alternating impacts.

The inventive subject matter of the present invention does not only result from the subject matter of the individual patent claims, but rather also from the combination of the individual patent claims with each other.

All disclosed statements and features, including the abstract, in particular the spatial formation represented in the drawings, are claimed as essential to the invention, provided they are new in comparison to the state of the art, either individually or in combination.

In the following the invention will be explained in greater detail with the help of several drawings representing embodiments. In this connection further features and advantages essential to the invention result from the drawings and their description.

BRIEF DESCRIPTION OF THE DRAWINGS

The drawings show the following:

FIG. 1: top view of the installation situation of the high-pressure coupling device on a machine table;

FIG. 4: an arrangement in accordance with FIG. 2 in installed state in released (on) position;

FIG. 7: the bottom view of a workpiece pallet;

FIG. 8: section through a workpiece pallet in accordance with FIG. 7;

FIG. 9: an enlarged section through a high-pressure coupling device in accordance with FIGS. 4 through 6;

FIG. 10: an embodiment that has been modified in comparison with FIG. 9;

FIG. 11: an embodiment that has been further modified in comparison with FIGS. 9 and 10.

DETAILED DESCRIPTION

Figure 3:
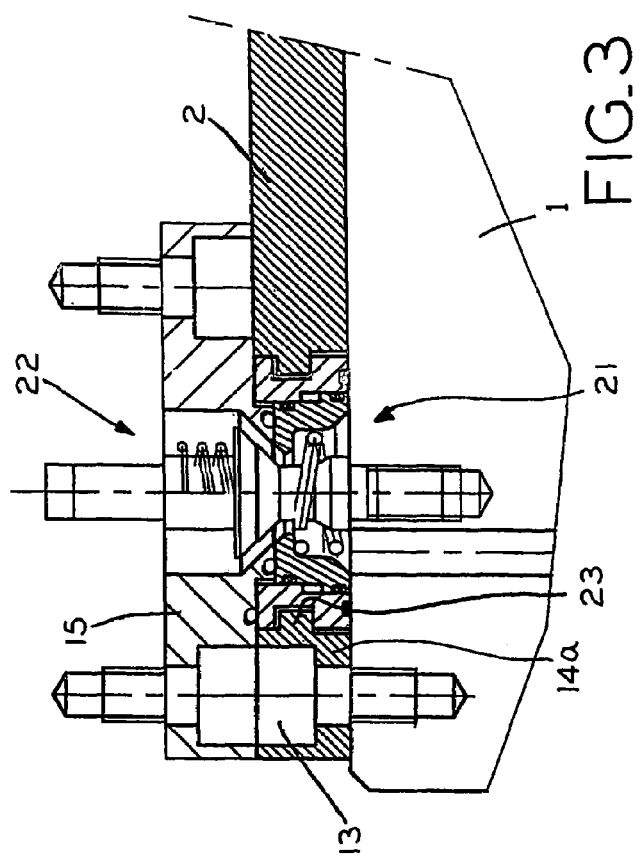
FIG. 3: an embodiment in section that has been modified in comparison with FIG. 2.

FIG. 1 represents in general that a rapid-action clamping cylinder 4 is arranged on a machine table 1, the cover 2 of which is screwed onto the machine table 1 with associated screws 18.

The rapid-action clamping cylinder is shown in greater detail in FIGS. 6 through 9. It is embedded in a recess 3 in the machine table 1 or it can—not shown in greater detail here—also be in a rapid-action closing plate. The term used here "machine table 1" is to be interpreted broadly. Instead of a conventional machine table conventional plates or even double superposed plates can be used, which permit an embedding of a high-pressure coupling device 20.

An insertion module 12 is installed in the recess 3, said insertion module consisting of a lower spring retaining plate which is screwed down with an upper bearing assembly. The spring 8 is mounted between these two socket-like parts, which is preferably constructed as a disk spring.

The rapid-action clamping cylinder 4 forms a central recess in which a feed nipple 7 engages, which can be locked there with balls 5 uniformly arranged on the periphery. The locking of the balls takes place in this connection by means of the elastic force of the spring 8, while the unlocking of the balls 5—placed aside in a radially outward direction by feed nipple 7—takes place by means of a piston 9 driven with compressed oil, which is admitted via a pressure oil inlet 10.

The pressure oil is in this connection conducted into a pressure chamber 11 and drives the piston 9 in terms of a downward directed movement, so that the balls 5 are disengaged with the circulating snap ring groove on the feed nipple 7. The feed nipple 7 can then be lifted out of the central catch opening 6 of the rapid-action clamping cylinder 4, as shown in FIG. 4.

Figure 5:
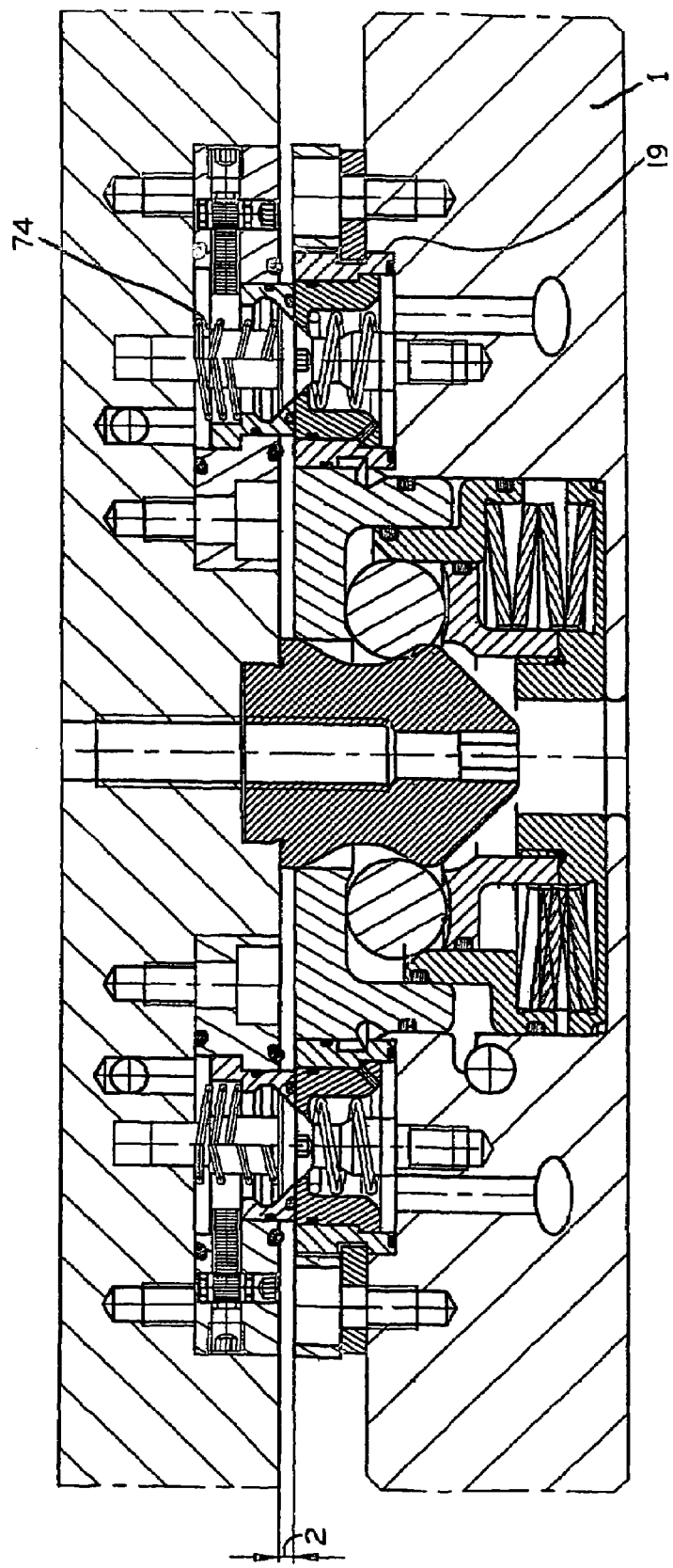
FIG. 5: the arrangement in accordance with FIG. 4 in fitted position.
Figure 6:
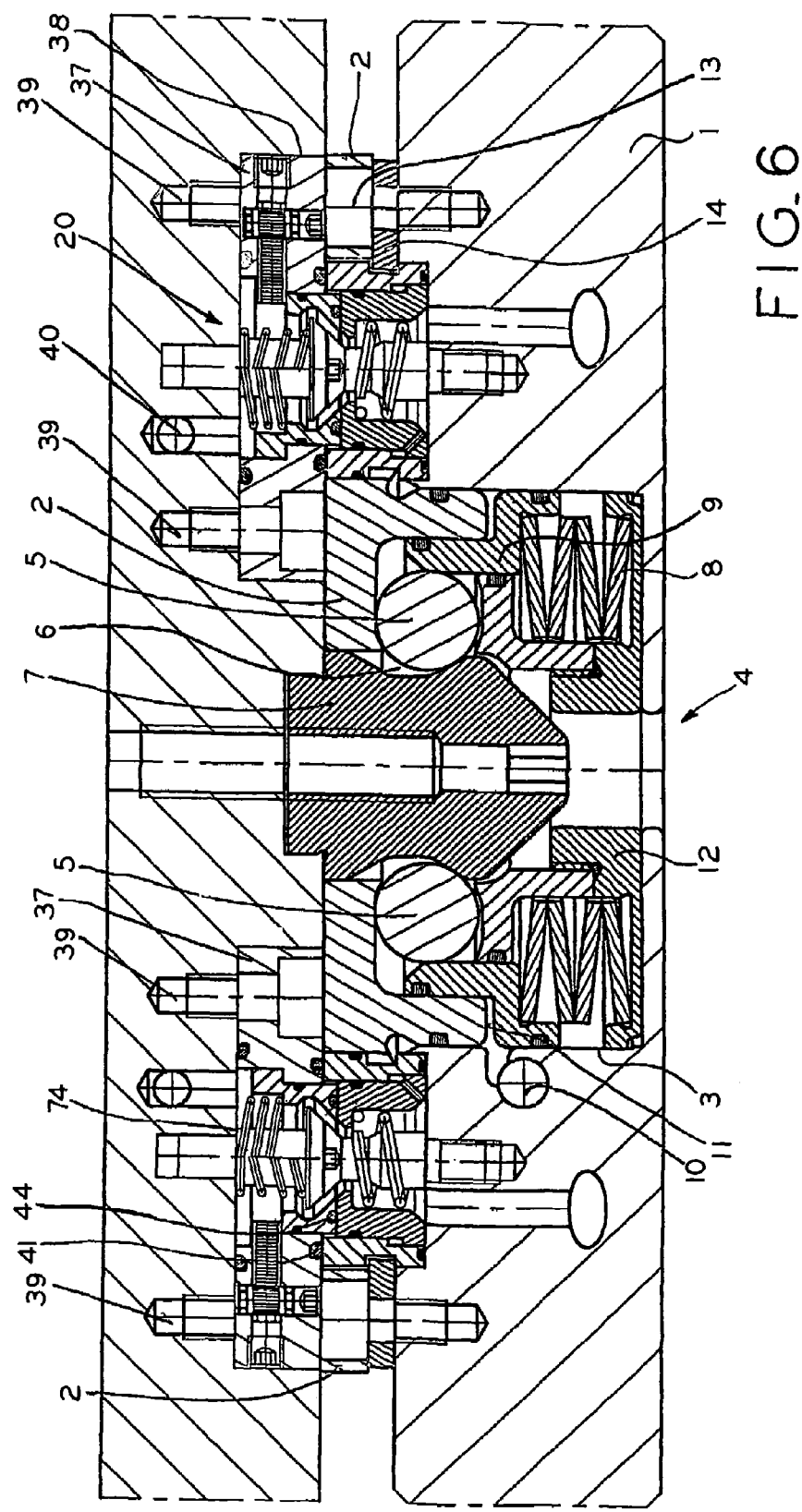
FIG. 6: the arrangement in accordance with FIGS. 4 and 5 in complete connection position

Thus FIGS. 4 through 6 show various closed positions of the rapid-action clamping cylinder, whereby in accordance with FIG. 4 the workpiece pallet 15 is connected to the feed nipple 7 is lifted from the machine table 1, while in FIG. 5 it is placed on the machine table 1 and in FIG. 6 the clamping position is achieved, where under great force the workpiece pallet 15 is pulled against the surface of the machine table 1 and the rapid-action clamping cylinder 4 supported there with high precision.

In known fashion clamping tools, which are not shown in greater detail, are arranged on the workpiece pallet 15; with which the workpieces to be machined are clamped. These can be hydraulic clamps and the like. Now it is important that in accordance with FIGS. 4 and 2 one or more oil bore holes 30, 31 are arranged in the machine table 1, via which the pressure oil at high pressure is conducted through the high-pressure coupling device 20, whereby the oil first flows through the coupling device bottom part 21, enters through the opened valve bodies there into the coupling device top part 22 and distributes itself in the additionally arranged oil bore holes 40 in the workpiece pallet 15.

This pressure oil is then supplied to the oil-hydraulic clamping devices and suchlike arranged on the workpiece pallet 15.

Now it is important in the case of the invention that the entire high-pressure coupling device 20 is in accordance with the invention arranged outside of the region of the rapid-action clamping cylinder 4, in particular outside the cover region of the cover 2.

While FIG. 1 does show that the cover 2 still extends over the installation area of the high-pressure coupling devices 20, however no transmission of load whatsoever or deformation work by the high-pressure coupling devices 20 takes place on the cover 2 of the rapid-action clamping cylinder 4.

Thus the invention expressly provides that the high-pressure coupling devices 20 in accordance with FIG. 1 are also attached outside of the cover 2 directly to the machine table. For reasons of space the present invention shows however that the high-pressure coupling devices 20 are arranged outside the central recess 3 for the rapid-action clamping cylinder 4 and in particular exhibits no burden-transmitting connection whatsoever to the cover 2 of the rapid-action clamping cylinder 4.

This can also be recognized due to the fact that the eight screws 18 which tighten the cover 2 to the machine table 1 are arranged outside of the attachment region of the four high-pressure coupling devices 20 shown in top view in FIG. 1. Each of the high-pressure coupling devices 20 represented there is namely attached with three separate clamp screws 13 uniformly distributed on the periphery, whereby these screws 13 are screwed in directly through the cover 2 into the machine table 1 and in this connection in accordance with FIG. 2 each screw 13 is connected with a clamping shoe 14, which positively engages in the associated pipe body 24 of the coupling device bottom part 21 and with it clamps the coupling device bottom part on the machine table.

With this the stop edge 75 in the region of the fastening of the pipe body 24 of the coupling device bottom part 21 is directly clamped to the machine table 1.

While two clamp screws 13 with eccentrically rotating clamping shoes 14 hold the pipe body 24, the third clamp screw 13 exhibits a circular disk 17, which also engages in an associated groove on the periphery of the pipe body 24 of the coupling device bottom part 21.

Each clamping shoe 14 can thus be freely rotated by means of a corresponding hexagon head screw and with it can be disengaged from its engaged position with the associated groove in the pipe body 24 with this groove in the pipe body 24. With this a rapid-release attachment of the coupling device bottom part 21 on the machine table 1 is shown. Now it is important that the entire coupling device bottom part 21 is installed in a recess 19 in the machine table 1 that is countersunk and open to the top, so that the pipe body 24 belonging to the coupling device bottom part 21 fits positively in this recess 19 with the corresponding stop edges and is protected from corresponding deformation.

Figure 2:
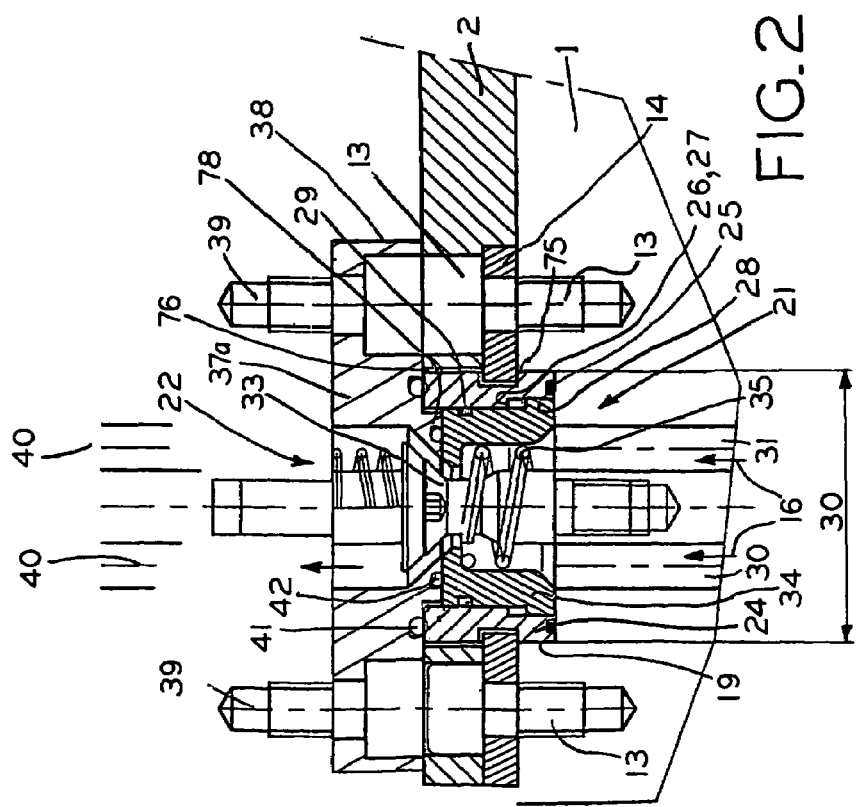
FIG. 2: a partial section through a direction of media in accordance with FIG. 1.

From the drawing in FIG. 2 it can incidentally be recognized that a corresponding radial clearance to the associated peripheral surfaces in the recess in the cover exists, so that no transmission of load takes place there between the pipe body 24 of the coupling device bottom part 21 to the cover 2.

In this manner a corresponding thermal expansion clearance is guaranteed for the pipe body 24 in the region of the recess in the cover 2.

In a further development of the invention provision can even be made that this gap 76 is cooled with blast air in order to prevent a corresponding impermissible thermal expansion of the coupling device bottom part.

The gap 76 between the coupling device bottom part 21 and the recess in the cover 2 of the rapid-action clamping cylinder 4 thus prevents an undesirable heat transfer to this cover 2 and with it also an undesirable deformation work on the rapid-action clamping cylinder, which otherwise could become distorted and cause inaccurate machining on the workpieces clamped on the workpiece pallet 15.

By means of the countersunk, positive insertion of the pipe body 24 of the coupling device bottom part in the associated recess 19 in the machine table any undesirable radial expansion of the coupling device bottom part in terms of a sealing member is intercepted and prevented. With this it is possible to receive with relatively small material cross sections for the pipe body 24 without direct flow forces and high oil compression forces, because the named parts in the recess 19 are supported against radial expansion.

Along with the support a positionally correct positioning and centering of the coupling device bottom part in the machine table is guaranteed FIG. 3 shows as a simplified embodiment for the design of a high-pressure coupling device that said coupling device can also be fastened directly to the machine table 1. In this connection the clamp screws 13 engage in associated clamping shoes 14a, which engage with dog points 23 directed radially inward in an associated circumferential groove in the region of the pipe body 24.

However, such a design cannot absorb such high deformation work as by way of comparison the design in accordance with FIG. 2 can. It is only intended to illustrate that a construction solution in accordance with FIG. 3 in comparison with the installation solution in accordance with FIG. 2 for the coupling device bottom part is also being claimed.

In the following the superior sealing of the individual coupling device parts is described in greater detail in connection with FIG. 2 and FIG. 9.

First it is essential that the pipe body 24 is seated in sealing manner on its face with a lower sealing ring 25 on the bottom of the recess 19 in the machine table. In the pipe body 24 a gate valve socket 34 is movably arranged under spring load, whereby this gate valve socket 34 exhibits a ring extension 28 of an enlarged diameter on its bottom, which can be moved in an associated ring recess 26. The upper area of the ring recess is formed by a stop edge 27, to which the ring extension 28 attaches in the off position. Simultaneously a sealing cone 72 at the upper end of the gate valve socket 34 is resting on an associated sealing bevel 73 in the region of the head 33 of a valve screw 32.

As a result of this the sealing surface resulting in the off position is formed.

Now it is important that this valve screw 32 with an associated threaded bolt 61 is screwed into an associated tapped hole in the machine table and thus forms a stationary and constant abutment for the oil flow permeating the high pressure coupling device 20.

The aforementioned gate valve socket 34 is initially tensioned in the direction toward its off position with a relatively weakly mounted valve spring 35, whereby this spring 35 only has to overcome the friction of the gasket 29 at the inner area of the pipe body 24, in order to place the gate valve socket 34 in its off position.

Incidentally, FIG. 9 shows that in the region of the ring extension 28 of the gate valve socket 34 a transverse vent hole 36 is present, which makes it possible to relieve the pressure oil from the ring recess 26 in the region of the central recess of the high-pressure coupling device 20.

The gate valve socket 34 is sealed via a long sealing path, namely once in the region of its ring extension 28 directed radially outward and secondly in its radially offset cylindrical region, in which the gasket 29 is arranged.

In FIGS. 2 and 9 the two coupling device parts 21, 22 of the high-pressure coupling device 20 are fluid-conductingly connected to each other. The two valve parts opposite each other are thus in on position.

The coupling device top part 22 consists essentially of a valve flange 37a (see FIG. 2) which is fixed in an associated recess 38 to the underside of the workpiece pallet 15 by means of screws 39. In this way an excellent centering of the coupling device top part 22 in this recess 38 is achieved and in other respects the same advantages are achieved as were explained with the help of the coupling device bottom part 21 in its recess 19.

FIG. 2 shows a first embodiment of a coupling device top part with a positively controlled valve, because the valve flange 37a is connected in a single piece with an associated ring extension 78, which can be inserted for activation of the lower valve body 34 of the valve bottom part to the central recess between the top and bottom parts 21, 22. With that this ring extension 78 acts in terms of an opening movement to the spring-loaded counteracting valve body 34 in the bottom part 21.

The valve flange 37a exhibits for this purpose a gasket 42 on the contact surface to the valve body 34.

An additional gasket 41 is arranged radially outward and on the other side of the ring extension 78, said gasket which ensures that in the case of leakage pressure oil does not escape from the gasket 42 over time.

Said oil is retained by the gasket 41.

Because the gasket 41 is staggered at an axial distance to the ring extension 78 back in the valve flange 37a, it is subject to a lower risk of damage than comparatively the gasket 42 arranged at the front ring extension 78.

In the coupling top device 22 a valve body 43 (FIG. 9) is movably arranged under spring load. This consists essentially of a cone-shaped valve disk 46, which is connected to an associated tappet 50, said tappet which is movably guided into an axial bore hole 49 in the workpiece pallet 15.

At the side of the valve disk 46 the one end of a weakly dimensioned spring 45 rests, which supports itself with its other end on the bottom of the recess 38.

A more amply dimensioned spring 47 is present which also supports itself with its one end on the bottom of the recess 38 and with its other end on the valve body 43.

Said spring is thus held spring-loaded in axial location moved downward, as shown in FIG. 8.

The smaller spring 45 tensions the conical valve disk 46 in off position against the sliding valve body 43.

The front of the valve body 43 protruding from the recess 38 bears a gasket 44 on its front with which it rests upon the associated sealing body 34 on the coupling device bottom part (21) in a sealing manner.

The valve flange is in other respects sealed from the bottom of the recess 38 with a gasket 59 and bears a gasket 41 on the opposite side which has already been described with the help of FIG. 6.

The movable valve body 43 bears a gasket 5 at its outer periphery, with which it can be moved into the valve flange 37.

The valve body 43 forms a ring flange directed axially and radially outward, said flange cooperating with a lower stop edge 48 in combination with a stationary stop edge in the region of the central recess 68.

In other respects, FIGS. 4 through 9 also show a valve block 52 for the purpose of blocking the valve body's path of displacement.

If the valve body 43 is not blocked and is fully movable, then the two springs 45, 47 act on the valve body 43 in terms of a closing movement.

In some cases the spring-loaded closing of the valve body 43 is undesirable. Thus in accordance with the invention a forced guidance of the valve body 43 is to be provided.

This forced guidance is achieved as a result of the fact that by means of a valve block 52 the path of displacement of the valve body 43 is blocked and said valve body is continuously held in its extended position, as for example depicted in FIGS. 4 through 9.

To achieve this blocking of the valve a cross hole is arranged in the valve flange 37, in which a pinion 55 is pivoted, which exhibits an actuating opening 56 for engagement of a wrench. This pinion 55 combs with a rack 54 which is movable in the region of a transverse slot 57 in the valve flange 37. The transverse slot is closed on its front by a plug 53.

In the rotary actuation of the pinion 55 the rack 54 is consequently moved in the direction of the arrow 69 and in its opposite direction, as a result of which the end 58 of the rack either engages or disengages with the front of the valve body 43.

In the engage position of the end 58 of the rack 54 the valve body 43 is consequently blocked in its front displacement position and can no longer be moved against the force of the spring.

The pinion 55 in other respects bears gaskets at its two opposing ends in order to prevent an escape of the pressure oil from this region.

If the valve block 52 is disengaged, then the valve body 42 can spring back and there is no risk of damage when the workpiece pallet with the coupling device top part is placed on a smooth surface on the machine table 1 without meeting a coupling device bottom part 21.

On the other hand, if the valve block 52 is engaged then the ring extension 78 of the valve body 43 extends out of the recess of the valve flange 37 and hangs over this area. In the case of high load change impacts caused by corresponding impacts in the pressure oil the valve body 43 can consequently no longer lift with its gasket 44 at the opposite surface in the coupling bottom part 21. With this a positive locking is guaranteed, which works without spring force and therefore cannot vibrate and result in self-destructions.

While FIG. 9 shows a valve block 52 that can be engaged and disengaged, FIGS. 10 and 11 show other designs. FIG. 10 shows that in the absence of valve blocking only a spring load of the valve body 43 is present, whereby this design is not suitable for high load change in the pressure medium.

However, FIGS. 10 and 11 also show that the coupling device bottom part 21 with an radially external thread lug 62 can be screwed into the associated recess in the machine table 1 while on the other hand the coupling device top part 22 with a thread lug 63 directed radially outward can be screwed into an associated recess in the workpiece pallet 15. Thus it is a matter of a different type of fastening than as explained previously with screws 39 and 13.

FIG. 11 shows a design in which a positive locking of a valve body is present, because the valve body 43 has been dropped altogether. The valve flange is connected in one material piece with an axially protruding ring extension 77 which therewith directly activates the lower valve body 34 in the coupling device bottom part.

This embodiment is suitable for very high load change and high pressures, because due to the large-area threaded screw connections with the thread lugs 62, 63 high shearing forces can be absorbed in comparison to the previously mentioned screws 39, 13.

The coupling device top part 22 in accordance with FIG. 11 is fixed to a threaded recess on the inner side of the workpiece pallet 15 by means of the engagement of a socket wrench in the associated socket wrench bore 64.

The coupling device bottom part 21 has a similar socket wrench bore 65, so that this is also screwed with the thread lug 62 into the associated recess in the machine table 1.

FIG. 10 has a radially directed socket wrench bore 65 in comparison to the aforementioned axially directed socket wrench bore 65, which permits the arrangement of an additional gasket in this region.

The valve actuation between the coupling device top part 22 and the coupling device bottom part 21 takes place accordingly only through a ring extension 78, which is either attached directly on the valve flange 37 or is part of a valve body 43.

This ring extension 78 thus engages by the amount of the depth of immersion 66 in the coupling device bottom part 21 and consequently actuates the lower valve body 34 in the on position.

Incidentally it is important that the valve screw 32 screwed in the machine table still have a centering shoulder 60, with which the valve screw in the machine table is additionally centered.

Therewith it is ensured that the thread hole with reference to the threaded bolt 61 is aligned precisely flush to the longitudinal axis of the valve screw 32, because this screw is additionally aligned in the centering shoulder 60.

With this a concentricity of the longitudinal axis of the valve screw 32 to the central recess in the coupling device bottom part is achieved.

In the region of the depth of immersion 66 thus a precisely concentric joining gap 67 results all the way around the ring extension 78 immersed in the bottom part, as depicted in FIG. 9.

This joining gap 67 sees to it that no heat transfer can take place in this region.

In accordance with FIG. 10 the valve body 43 arranged in the coupling device top part 22 can also have a transverse ventilation hole 70, which guarantees a pressure oil compensation of the central recess in the direction toward the rear of the valve body, in order to prevent a strong suctioning of this valve body in the central recess during displacement.

The valve disk 46 forms a sealing cone which rests in a sealing position on the opposing sealing cone 71 in the region of the valve body 43 (see FIG. 10).

Aside from this FIG. 9 shows that the tappet 50 of reduced diameter transforms into a cylindrical bolt of larger diameter at whose front free end finally the valve disk 46 is arranged.

In the transition region between the tappet 50 and the bolt of larger diameter a vertical stop edge 74 is constructed, so that an absolute straight line guide of the entire valve body 46, 50 in the associated bore hole 49 is given. This prevents the valve body from jamming or hammering when high pressure change impacts take place in the central recess 68.

The valve body is thus guided completely shut in and locked in position

If now for example the pressure oil flows at a high pressure in the direction of the arrow 16 in accordance with FIG. 2 over the oil bore holes 30, 31 specified there against the underside of the fixed valve screw 32, then this valve screw absorbs the corresponding load via its bolt end and via the engagement of the threaded bolt 61 in the machine table. This compression force is then not transferred to the valve disk 46 of the valve arranged in the coupling device top part arranged above, as a result of which said valve is kept free from pressure transmission.

Therefore the undesirable bulging and mushrooming of the high pressure coupling device does not take place because the essential pressure absorption is taken over by a fixed valve screw 32 anchored in the machine table.

Therewith an impermissibly high expansion force or tearing force between the coupling device top part and the coupling device bottom part is prevented, because in essence the entire oil pressure is absorbed by the conical valve screw 32 extending radially outward and the head of the valve screw rests in sealing manner on the opposing valve part in the coupling device top part, as a result of which this area no longer lies in the pressure oil flow, The active surface in the pressure oil flow corresponding to the maximum diameter of the head of the valve screw 32 thus absorbs the corresponding load, so that this load no longer acts on the high-pressure coupling device in terms of a tearing force.

For this reason the rapid-action clamping cylinder no longer has to absorb such high forces as compared to the state of the art, where high tearing forces acted between the two coupling device parts associated with each other.

The coupling device parts arranged there had diameters differing in size with regard to the supporting surface adjoining each other, which resulted in a differential force that acted in terms of a tearing movement.

In the case of the invention, on the other hand the contact surface at the face of the conical valve screw is level and flush with the associated contact surface. These relationships are depicted in FIG. 9, where it can be recognized that one contact surface 79 is developed which develops between the underside of the conical valve disk 46 and the front of the valve screw 32.

The contact surface 79 is excluded from the hydraulically active surface because only the clear opening 80 in the flow annular gap 81 is hydraulically active.

KEY TO THE DRAWINGS

1 Machine part
2 Cover
3 Recess
4 Rapid-action clamping cylinder
5 Ball
6 Catch opening
7 Feed nipple
8 Spring
9 Piston
10 Pressure oil inlet
11 Pressure chamber
12 Insertion module
13 Clamp screw
14 Clamping shoe 14a
15 Workpiece pallet
16 Direction of the arrow
17 Disk
18 Screw
19 Recess (machine table)
20 High-pressure coupling device
21 Coupling device bottom part
22 Coupling device top part
23 Dog points
24 Pipe body
25 Sealing ring
26 Ring recess
27 Stop edge
28 Ring extension
29 Gasket
30 Oil bore hole
31 Oil bore hole
32 Valve screw
33 Head 34 Gate valve socket
35 Valve spring
36 Ventilation hole
37 Valve flange 37a
38 Recess
39 Screw
40 Oil bore hole
41 Gasket (Flange 37)
42 Gasket
43 Valve body
44 Gasket
45 Spring (small)
46 Valve disk
47 Spring (large)
48 Stop edge
49 Bore hole
50 Tappet
51 Gasket
52 Valve block
53 Plug
54 Rack
55 Pinion
56 Actuating opening
57 Transverse slot
58 End (rack 54)
59 Gasket
60 Centering shoulder
61 Threaded bolt
62 Thread lug
63 Thread lug
64 Socket wrench bore
65 Socket wrench bore
66 Depth of immersion
67 Joining gap
68 Recess
69 Direction of the arrow
70 Ventilation hole
71 Sealing cone
72 Sealing cone
73 Sealing bevel
74 Stop edge
75 Stop edge
76 Gap
77 Ring extension
78 Ring extension
79 Contact surface
80 Clear opening
81 Annular gap

The invention claimed is:

1. High-pressure coupling device for directing media through quick-change systems in a machine table, wherein the high-pressure coupling devices comprises: a coupling device bottom part and a coupling device top part, the coupling bottom part including a firmly anchored, rigid valve screw element which creates a sealing effect for delivering the media and a movable spring-loaded gate valve socket element while the top coupling part is provided with a movable spring-loaded valve disk element that creates a sealing effect for a side of the coupling device which is to be supplied with high-pressure medium, together with a rigid valve body element, such that a rigid valve element of one of the coupling parts actuates the spring-loaded valve element of the opposite coupling part in the high-pressure coupling device in a valve-actuating manner to form a valve arrangement when the bottom coupling part and the top coupling part are joined.

2. High pressure coupling device in accordance with claim 1, wherein the valve arrangement between the coupling bottom part and the coupling top part is synchronous and positively controlled.

3. High pressure coupling device in accordance with claim 2, including means for positive control of the valve arrangement such that the spring-loaded valve elements are actuated in such a way from the respective opposite part of the valve elements that the valve elements do not begin oscillating as a result of the medium flow passing through.

4. High pressure coupling device in accordance with claim 3, wherein flow of the medium keeps the spring loaded elements of the high-pressure coupling device in check, without moving them against a spring load.

5. High pressure coupling device in accordance with claim 3, wherein the valve screw in the bottom part with an associated threaded bolt is screwed into an associated tapped hole in the coupling device bottom part and thus forms a stationary and constant abutment for the medium flow permeating the high pressure coupling device.

6. High pressure coupling device in accordance with claim 1, wherein the gate valve socket in the valve bottom part is initially tensioned in the direction toward its off position with a relatively weakly mounted valve spring, whereby this spring only has to overcome the friction of the gasket at the inner area of the pipe body, in order to place the gate valve socket in its off position.

7. High pressure coupling device in accordance with claim 1, wherein in the region of a ring extension of the gate valve socket a transverse vent hole is present.

8. High pressure coupling device in accordance with claim 7, wherein the gate valve socket is sealed via a sealing path, once in the region of its ring extension directed radially outward and secondly in a radially offset cylindrical region, in which a gasket is arranged.

9. High pressure coupling device in accordance with claim 1, wherein the coupling device top part consists essentially of a valve flange which is fixed in an associated recess to an underside of a workpiece pallet by means of screws, so that centering of the coupling device top part in this recess is achieved 10. High pressure coupling device in accordance with claim 1, wherein the spring-loaded valve element in the coupling device top part can be optionally blocked or released, as a result of which the high-pressure coupling device can be operated either positively controlled or non-positively controlled.

11. High pressure coupling device in accordance with claim 1, wherein the coupling device bottom part is fastened with clamp screws screwed in directly through a cover into a machine table.

12. High pressure coupling device in accordance with claim 11, wherein each of the screws is connected with a clamping shoe, which positively engages in the associated pipe body of the coupling device bottom part and with it clamps the coupling device bottom part on the machine table.

13. High pressure coupling device in accordance with claim 12, wherein two said clamp screws with eccentrically rotating clamping shoes hold the pipe body.

14. High pressure coupling device in accordance with claim 13, wherein a further clamp screw includes a circular disk, which also engages in an associated groove on the periphery of the pipe body of the coupling device bottom part.

15. High pressure coupling device in accordance with claim 14, wherein each said clamping shoe can be freely rotated by means of a corresponding screw and with it can be disengaged from its engaged position with the associated groove in the pipe body and vice versa.

16. High pressure coupling device in accordance with claim 11, wherein the entire coupling device bottom part is installed in a recess in the machine table that is countersunk and open so that the pipe body belonging to the coupling device bottom part fits positively in this recess with corresponding stop edges and is protected from corresponding deformation.

17. High pressure coupling device in accordance with claim 16, wherein a corresponding radial clearance to the associated peripheral surfaces in a recess in the cover exists, so that no transmission of load takes place there between the pipe body of the coupling device bottom part to the cover.

18. High pressure coupling device in accordance with claim 17, wherein a thermal expansion clearance is provided for the pipe body in the region of the recess in the cover.

19. High pressure coupling device in accordance with claim 18, including a gap between the coupling device bottom part and the recess in the cover of a rapid-action clamping cylinder that prevents an undesirable heat transfer to this cover and with it also undesirable deformation action on the rapid-action clamping cylinder, which otherwise could become distorted and cause inaccurate machining on the workpieces clamped on the workpiece pallet.

20. High pressure coupling device in accordance with claim 19, wherein the gap is cooled with blast air in order to prevent a thermal expansion of the coupling device bottom part.

21. High pressure coupling device in accordance with claim 1, wherein a front portion of the valve body element in the coupling device top part protruding from the recess bears a gasket on its front with which it rests upon the associated sealing body on the coupling device bottom part in a sealing manner.

22. High pressure coupling device in accordance with claim 1, wherein the valve socket element can be moved in a valve flange.

23. High pressure coupling device in accordance with claim 22, including a valve block whereby the path of displacement of the valve body element can be blocked, so that said valve body element is continuously held in its extended position.

24. High pressure coupling device in accordance with claim 23, wherein in order to achieve a blocking of the valve body element a cross hole is arranged in a flange, in which a pinion is pivoted, which includes an actuating opening for engagement of a wrench.

25. High pressure coupling device in accordance with claim 24, wherein the pinion combs with a rack which can be moved in the region of a transverse slot in the valve flange.

26. High pressure coupling device in accordance with claim 25, wherein the rotary actuation of the pinion the rack is moved axially as a result of which an end of the rack either engages or disengages with the valve body element.

27. High pressure coupling device in accordance with claim 26, wherein in the engaged position of the end of the rack the valve body element is blocked in its front displacement position and can no longer be moved against the force of a spring engaging the valve body element.

28. High pressure coupling device in accordance with claim 24, wherein the pinion bears gaskets at its two opposing ends in order to prevent an escape of pressure medium from an associated region.

29. High pressure coupling device in accordance with claim 23, wherein when a valve block is disengaged, the valve body element can spring back and there is no risk of damage when a workpiece pallet with the coupling device top part is placed on a smooth surface on the machine table.

30. High pressure coupling device in accordance with claim 29, wherein when the valve block is engaged then a ring extension of the valve body element extends out of a recess of a valve flange and hangs over this area, so that in the case of high load change impacts caused by corresponding impacts in the medium flow the valve body element can no longer lift with its gasket at the opposite surface in the coupling bottom part, as a result of which a positive locking is guaranteed, which works without spring force and therefore cannot vibrate and result in self-destructions.

31. High pressure coupling device in accordance with claim 1, wherein in the coupling device top part in a transition region between the tappet and a bolt of larger diameter a vertical stop edge is constructed, so that an absolute straight line guide of the entire valve body element in an associated bore hole is given; as a result preventing the valve body element from jamming or hammering when high pressure change impacts take place in a central recess.

32. High pressure coupling device in accordance with claim 1, wherein the valve screw in the coupling device bottom part has a centering shoulder, with which the valve screw in the machine table can be centered.

33. High pressure coupling device in accordance with claim 1, wherein the high-pressure coupling device in the machine table is arranged outside of a central recess for a rapid-action clamping cylinder, and in particular does not exhibit any load-transferring connection whatsoever to a cover of the rapid-action clamping cylinder.

* * * * *

UNITED STATES PATENT AND TRADEMARK OFFICE
CERTIFICATE OF CORRECTION

| | |
|---|---|
| PATENT NO. | : 7,654,285 B2 |
| APPLICATION NO. | : 10/553645 |
| DATED | : February 2, 2010 |
| INVENTOR(S) | : Emil Stark |

It is certified that error appears in the above-identified patent and that said Letters Patent is hereby corrected as shown below:

Claim 5, Column 14, Line 19, after medium delete "the"

Claim 6, Column 14, Line 26, after gasket delete "the" and insert --an--

Claim 19, Column 15, Line 27, delete "the" and insert --a--

Claim 30, Column 16, Line 31, delete "self-destructions" and insert --self-destruction--

Claim 31, Column 16, Line 34, delete "the" and insert --a--

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,654,285 B2                                 Page 1 of 1
APPLICATION NO. : 10/553645
DATED            : February 2, 2010
INVENTOR(S)      : Emil Stark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Twenty-third Day of November, 2010

David J. Kappos
*Director of the United States Patent and Trademark Office*